United States Patent
Madsen et al.

(10) Patent No.: US 9,180,630 B2
(45) Date of Patent: Nov. 10, 2015

(54) MANUFACTURE OF A ROOT SECTION

(71) Applicants: Kristian Lehmann Madsen, Fredericia (DK); Karsten Schibsbye, Boulder, CO (US)

(72) Inventors: Kristian Lehmann Madsen, Fredericia (DK); Karsten Schibsbye, Boulder, CO (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 158 days.

(21) Appl. No.: 13/663,867

(22) Filed: Oct. 30, 2012

(65) Prior Publication Data
US 2013/0111752 A1 May 9, 2013

(30) Foreign Application Priority Data

Nov. 4, 2011 (EP) .................................. 11187863

(51) Int. Cl.
*B21K 25/00* (2006.01)
*B29C 70/48* (2006.01)
*F03D 1/06* (2006.01)
*B29C 70/86* (2006.01)
*B29L 31/08* (2006.01)

(52) U.S. Cl.
CPC ............. *B29C 70/48* (2013.01); *F03D 1/065* (2013.01); *B29C 70/86* (2013.01); *B29L 2031/085* (2013.01); *F05B 2260/301* (2013.01); *F05B 2280/6003* (2013.01); *Y02E 10/721* (2013.01); *Y02E 10/722* (2013.01); *Y10T 29/49336* (2015.01); *Y10T 29/49337* (2015.01)

(58) Field of Classification Search
CPC ... B29C 70/48; B29C 70/86; B29L 2031/085; F03D 1/065; F05B 2280/6003; Y10T 29/49336; Y10T 29/49337; Y02E 10/721
USPC .............................. 29/889.7, 889.71, 889.72
See application file for complete search history.

(56) References Cited

U.S. PATENT DOCUMENTS

| 4,915,590 | A | 4/1990 | Eckland |
| 2007/0253819 | A1 | 11/2007 | Doorenspleet et al. |
| 2010/0260612 | A1 | 10/2010 | Bedi |
| 2012/0093656 | A1* | 4/2012 | Esaki et al. ............... 416/229 R |

FOREIGN PATENT DOCUMENTS

| EP | 1633624 A1 | 12/2004 |
| EP | 2138716 A1 | 12/2009 |
| WO | WO 03057457 A1 | 7/2003 |
| WO | WO2004110862 A1 | 12/2004 |
| WO | WO 2012140039 A2 | 10/2012 |

* cited by examiner

*Primary Examiner* — Ryan J Walters

(57) ABSTRACT

A method of manufacturing a root section of a rotor blade of a wind turbine is disclosed. The method includes assembling a plurality of supporting rods with an interface section to a hub interface of the wind turbine in an essentially circular shape such that there are gaps between the supporting rods; arranging first fibers in the gaps which first fibers are physically and/or chemically compatible with an injection material; placing a first molding tool along an outer surface of the circular shape and a second molding tool along an inner surface of the circular shape, treating the injection material so that it bonds with the first fibers. The invention also concerns a supporting rod holding arrangement for such purpose and a root section of a rotor blade manufactured by such method.

8 Claims, 6 Drawing Sheets

MANUFACTURE OF A ROOT SECTION

CROSS REFERENCE TO RELATED APPLICATIONS

This application claims priority of European application No. 11187863.3 EP filed Jul. 5, 2004. All of the applications are incorporated by reference herein in their entirety.

FIELD OF INVENTION

The present disclosure concerns a method of manufacturing a root section of a rotor blade of a wind turbine. It also concerns a supporting rod holding arrangement for such purpose and a root section of a rotor blade of a wind turbine.

BACKGROUND OF INVENTION

In a wind turbine the attachment of the root section of the rotor blades to the wind turbine's rotor hub is a very critical joint. Thereby, it has to be made sure that the root section is stable enough to transfer forces from the wind turbine blade into the hub. As an interface to the hub it is known to use metal parts which are inserted or attached in other ways to the very end of the root section. For instance, U.S. Pat. No. 4,915,590 teaches to use so-called sucker rods which are placed inside of the main body of a rotor blade and into which bolts can be screwed which connect an interface section of the hub with the rotor blade itself. Such sucker rods can for instance be glued into the main body. They have threads inside to receive the bolts coming from the hub.

It is also known to use a conical cylinder with threaded holes for a similar road attachment. The rotor blade is then adhered to the conical cylinder either by gluing or by placing a curing laminate directly in contact with the metal root. The conical cylinder may for instance be fabricated of aluminum.

Today's rotor blades of wind turbines are usually made of fibre reinforced plastic. For blades exceeding a length of 30 meters it is often a problem that the prevailing reinforcement fibres run in a longitudinal direction of the rotor blade. Only a few fibres are circumferential, which may lead to an ovalisation of the root end (also called root ring) once the blade is removed from the moulding tool where it has been produced. Once the blade is subjected to gravity forces without having a support the ovalisation occurs. This presents a problem when mounting the blade to the wind turbines hub or when further mechanical machining of the root end takes place, for instance the drilling of holes.

SUMMARY OF INVENTION

An enhanced production of a root end of a rotor blade of wind turbine is provided by a method according and by a supporting rod holding arrangement.

Accordingly, in the context of the above-mentioned method is enhanced by the following steps:
- assembling a plurality of supporting rods with an interface section to a hub interface of the wind turbine in an essentially circular shape such that there are gaps between the supporting rods,
- arranging first fibres in the gaps which first fibres are physically and/or chemically compatible with an injection material,
- placing a first molding tool along an outer surface of the circular shape and a second molding tool along an inner surface of the circular shape,
- treating the injection material so that it bonds with the first fibres.

Between the supporting rods along the circular extension of the circular shape there are gaps so that the supporting rods, which are may be aligned parallel to each other with respect to their longitudinal extension, are kept apart from each other. These gaps serve as a space in which an injection material, for instance a resin, which is to constitute the main body of the rotor blade, can be introduced in between the supporting rods. An essentially circular shape also comprises oval shapes which vary to an extent of up to 30% between their largest and their smallest diameter.

In order to provide for the desired stability in the longitudinal direction of the rotor blade fibres are filled into the gaps. Thereby, the supporting rods firstly function as a support for the first fibres in between them, and secondly as a kind of holding structure for the interface section to the hub. The fibres are thus held in place during a moulding process by the supporting rods which makes sure their orientation is kept while the injection material is treated, i.e. activated.

That means that the injection material connects directly with the fibres in a moulding process. Fibres which have already been subjected to a moulding process beforehand are more expensive and because the interconnection between such pre-packages and the rest of the injection material which is injected later is more difficult to establish and generally weaker. Therefore, it can be concluded that such unpreinjected fibres are cheaper to supply and surprisingly much easier to handle in the manufacturing process.

The injection material, such as a resin, and the fibres are physically and/or chemically compatible with each other, which means that a firm connection between the fibres and the injection material is possible and a fibre reinforced plastic composition is the result of the treatment process of the injection material. It may be noted in this context that the injection material may be injected in between the moulding tools, however it may also be sucked into this space by using vacuum, or in fact it may already be in place, for instance by using so-called prepregs (fibres which are already infiltrated with the injection material). At any event, the injection material is made sufficiently liquid to migrate between the fibres and then be cured in order to firmly bond with them.

The alignment of fibres in between the supporting rods and thus along the interface sections of the supporting rods provides for a very stable connection of the fibre-plastic composite with the interface sections so that strong forces may be withheld in the operation of the rotor blade. Thus in particular, an ovalisation of the root end may be avoided without problems.

The first and second molding tools may have a solid form, for instance be constructed as metal shells with a surface shape that corresponds to an inner or outer surface of a wind turbine rotor blade (or indeed only its root end) to be constructed. However, at least one of them may also be realized as an air and injection material tight bag which can be expanded by pressure and/or vacuum so that it is firmly pressed against the respective surface of the circular shape. The extensions of the first and second moulding tools limit the outer and inner surfaces of the root end of the rotor blade.

In other words, the supporting rods together with the fibres in between them are arranged along the circular shape and then subjected to an insert moulding process which serves to build up the root end of the rotor blade. In this context, it may be noted that the root end may be produced in one piece, i.e. in the completely circular structure. However, the expression "root end" also refers to a part of the root end which may be assembled with other parts of the root end so that it forms the entire root end in the end. Therefore, the expression "circular shape" also refers to a section of the circular shape, for example to a semicircle or the like.

The manufacturing process may be such that at a first longitudinal end of each of the supporting rods an interface section projects out of the main body of the root end. Such interface section generally comprises connection means suitable (such as bushings) for an attachment of the rotor blade to an interface of the wind turbines hub. These connection means must either be left accessible or an easy access must be made possible in the aftermath of the manufacturing process, for instance by drilling an access to the connection means.

A supporting rod holding arrangement for manufacturing a root section of a rotor blade of a wind turbine is also disclosed. Such supporting rod holding arrangement comprises an assembly of a plurality of supporting rods with an interface section to a hub interface of the wind turbine in an essentially circular shape such that there are gaps between the supporting rods, first fibres in the gaps which first fibres are physically and/or chemically compatible with an injection material, a holding device which holds the supporting rods in the essentially circular shape.

In essence, the supporting rod holding arrangement is made up of the supporting rods and of the first fibres in the gaps between them and of a holding device which serves to hold the supporting rods, and thus indirectly the first fibres in the circular shape. This holding is necessary for the insert moulding process as described above.

The holding device thereby can be realized as a supporting tool which designatedly serves to keep the supporting rods in place. Embodiments of such a supporting tool will become apparent in the context of the description below. However, the holding device may also comprise the first and/or the second moulding tool or in fact any other additional moulding tool. In such case the respective moulding tool serves to align the supporting rods along its inner or outer shape, for instance aided by additional fixing means such as adhesives or the like.

A root end of rotor blade of a wind turbine manufactured with a method is disclosed. Thereby, it may also be the case, that the root end is an integral part of the overall rotor blade. As outlined above, such root end can be manufactured to be particularly stable, apart from the fact that the process of manufacturing is less time-consuming and costly both concerning material and expenses.

Embodiments and features are given by the dependent claims, as revealed in the following description. Thereby, features revealed in the context of the method may also be realized in the context of the supporting rod holding arrangement and vice versa.

A space between the outer surface of the circular shape and the first molding tool and/or between the inner surface of the circular shape and the second molding tool may be filled with second fibres which are physically and/or chemically compatible to the injection material. The first fibres and the second fibres may comprise the same material, which makes them more compatible. The second fibres generally function as an additional reinforcement of the root end and may be orientated in a different way than the first fibres. For instance, they can be aligned and orientated along the circumferential extension of the root end. This provides for a particular reinforcement which may additionally help to prevent an ovalisation of the root end once it leaves the moulding tools. In other words, fibres are not just arranged in an inner area of the reinforced plastic material, but can also reach nearly up to the surfaces of the rotor blade and consequently provide for a stronger resistance against forces during the operation of the rotor blade. The second fibres, for instance (glass) fibre mats and/or rovings, may be fixed to any of the molding tools by for instance vacuum.

When the first fibres comprise a glass fibre material a very stable composite material is provided after the moulding process.

Generally, the first fibres may be orientated in different directions and used as single fibres which are only loosely assembled in between the supporting rods. The fibres may comprise a fibre roving with fibres orientated essentially in one main direction. Such fibre rovings are standard materials which can readily be obtained on the market. They may additionally be wrapped with a fibre structure on the outside, so that a kind of tubular structure with orientated fibres inside is provided. The main direction of the fibres provides for the possibility of easily orientating all or most of the fibres between the supporting rods. Also, fibre rovings may be available in particular preset sizes so that the sizes of the gaps between the supporting rods can in fact be chosen in dependence of the size of the available fibre rovings.

Even if the fibres are not supplied in the form of fibre rovings but rather of single fibres, the fibres may be orientated essentially in one main direction. Generally, that means also concerning fibre rovings, the main direction may be essentially parallel to longitudinal axes of the supporting rods. This means that the supporting rods, which may be aligned parallel with respect to their longitudinal orientations, provide the main direction of orientation of the fibres as well. They may thus support the fibres optimally and such arrangement helps to fill the gaps in between the supporting rods fully and properly.

Additionally, in an embodiment the supporting rods are wrapped with a filling element, the filling element may comprise fibres and/or a plastic tube. This helps to make the connection between the first fibres and the supporting rods (in particular the interface sections) stronger by providing surfaces of the supporting rods which are more compatible with the fibres than would be for instance a metal surface of the supporting rods.

As outlined above, in order to align the supporting rods in the circular shape a holding device may be used. The use of a supporting tool may be used, so that the method comprises the steps of temporarily securing the interface section of a supporting rod to a supporting tool which supporting tool may comprises a root flange, whereby the supporting rod is fixed to the root flange. Such root flange may have an essentially circular shape corresponding to the circular shape which the supporting rods are later to have. Such shape of the root flange can also be realized by arranging fixing structures such as holes for attaching the supporting rods to the flange in a circular shape. In fact, the geometrical shape of the root flange of the supporting tool may correspond to that of a root flange of the hub of the wind turbine to which the respective root end is later to be attached. In other words, the geometrical shape of the root flange of the supporting tool and/or of its fixing structures match with those of the root flange of the designated wind turbine.

A supporting rod may comprise a hollow shape and is open at an outer longitudinal end opposite of the interface section. This way it can be constructive particularly lightweight and injection material can also be introduced inside of the supporting rod. Thus, a better connection or bonding effect between the injection material and the supporting rod can be achieved.

Furthermore, a supporting rod may comprise a root end section such as a bushing old the like—generally speaking an interface for accommodation of a fastener connected to the hub—and a main section. The root end section and the main section are connected to each other via a transition area. This way the root end section may be specifically stabilized in order to form a stable interface to the hub, whereas the main section is not necessarily as stable as the root end section because it really only serves its purpose of holding the first fibres during the manufacturing process.

In such case the main section may be inserted into an inner side of the root end section in the transition area. This provides for a firm interconnection of both sections which can be manufactured separately and then interconnected in the transition area.

As the root end section is that part of the supporting rod which is to resist the greatest loads during operation of the rotor blade, the root end section may be embedded at least partially in fibre material. This provides for a better connection with the first (and second) fibre material and with the injection material so that a very firm connection between all those composite materials and the root end section can be achieved. This means that the forces from the rotor blade can easily be transferred into the hub via the root end sections of the supporting rods.

According to an embodiment, the root end section comprises steel, such as stainless steel, and/or the main section comprises aluminum. This way the root end section is once again made particularly stable, whereas the main section is particularly lightweight, which helps to construct a rotor blade which is as light as possible on the one hand and as stable as necessary on the other hand.

Other objects and features will become apparent from the following detailed descriptions considered in conjunction with the accompanying drawings. It is to be understood, however, that the drawings are designed solely for the purposes of illustration and not as a definition to be limiting.

BRIEF DESCRIPTION OF THE DRAWINGS

In the drawings, like reference numbers refer to like objects throughout. Objects in the diagrams are not necessarily drawn to scale.

DETAILED DESCRIPTION OF INVENTION

Figure 1:
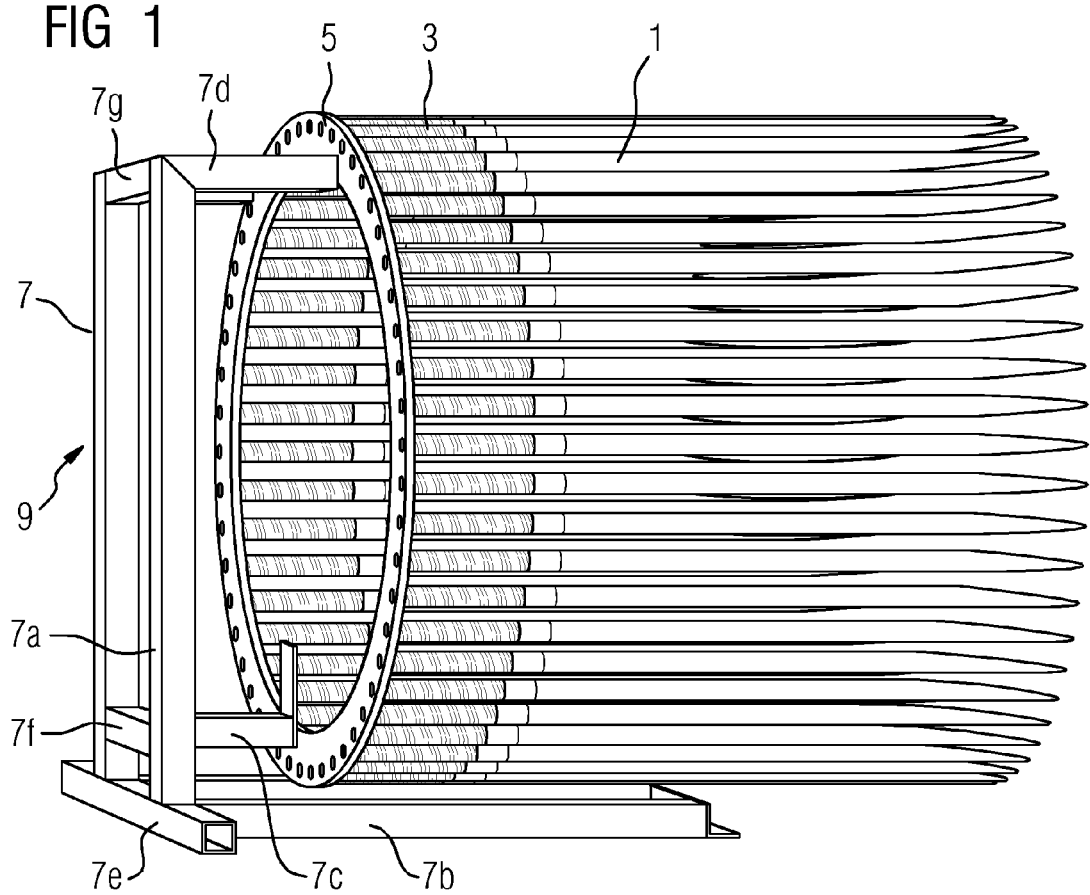
FIG. 1 shows a perspective view of an arrangement for building a supporting rod holding arrangement according to an embodiment.
Figure 2:
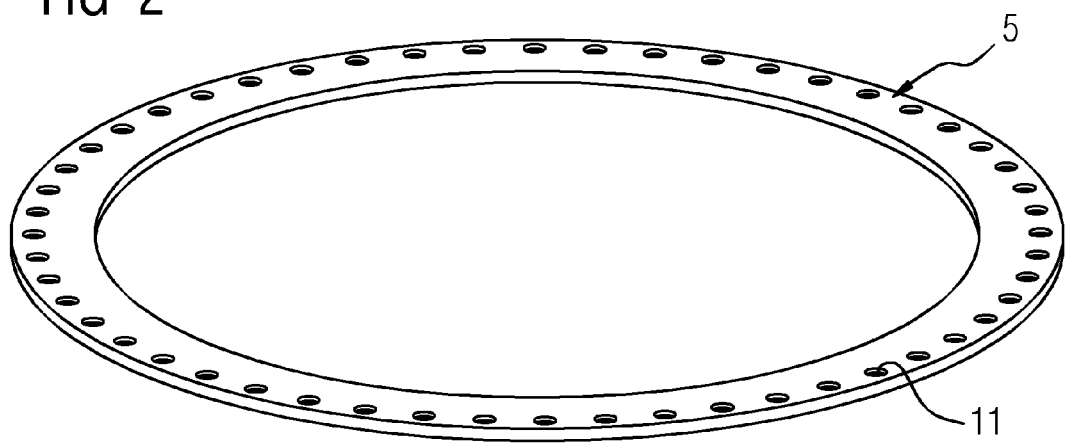
FIG. 2 shows a perspective view of the root flange of the arrangement of FIG. 1.
Figure 3:
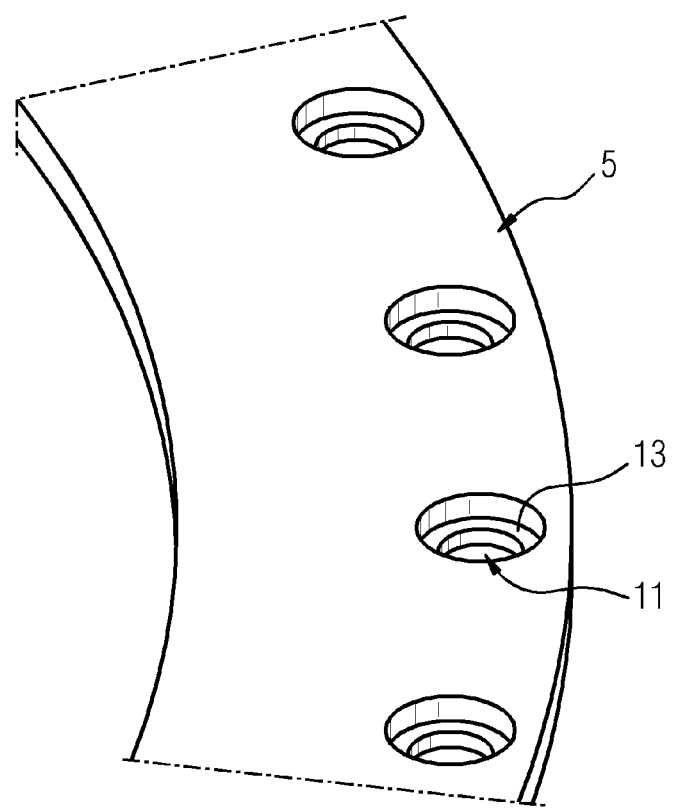
FIG. 3 shows a more detailed perspective view of the same root flange as in FIG. 2.

FIG. 1 shows an arrangement in which supporting rods 1 with root end sections 3 are aligned in a circular shape. For this purpose, the root end sections 3 are inserted into a root flange 5 of a circular shape. With reference to FIGS. 2 and 3 it can be observed, that the root flange 5 comprises holes 11 into which the root end sections 3 can be introduced to the point of an inner flange 13 inside the holes 11. This allows the supporting rods 1 to be temporarily held in place during a moulding process.

The root flange 5 is part of a supporting tool 9 which comprises a beam structure 7. This beam structures 7 comprises two vertical beams 7a which are interconnected by three horizontal beams 7e, 7f, 7g from which there project on the bottom side two support beams 7b and further upwards a first holding beam 7c and again further upwards to the upper end of the root flange 5 two more holding beams 7d. The beam structure 7 therefore provides for a stable construction to which the root flange 5 is attached via the first holding beam 7c and the second holding beams 7d. In between the support beams 7b and the lowest of the supporting rods 1, there is a gap into which a first moulding tool may be introduced.

Figure 4:
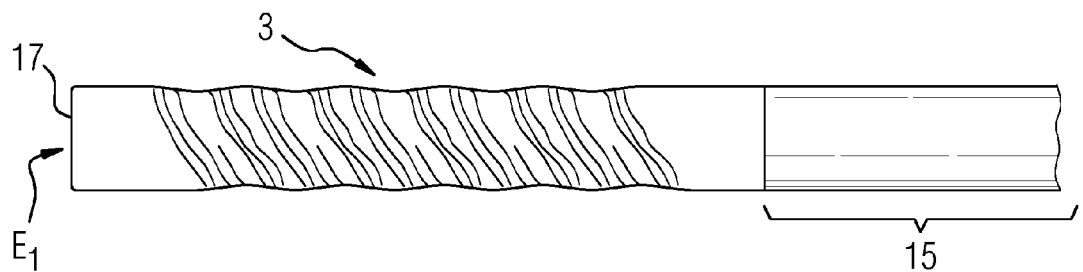
FIG. 4 shows a side view of the root end section of a supporting rod as can be used in the context of the arrangement according to FIG. 1.

FIG. 4 shows a root end section 3 of a supporting rod 1. At a first longitudinal end $E_1$ the root end section 3 comprises an interface 17 to a hub of a wind turbine, here realized as a bushing the outside surface of which is smooth and non-curved. At its other longitudinal end the root end section 3 comprises a transition area 15 to a main section of the supporting rod 1 (not shown).

Figure 5:
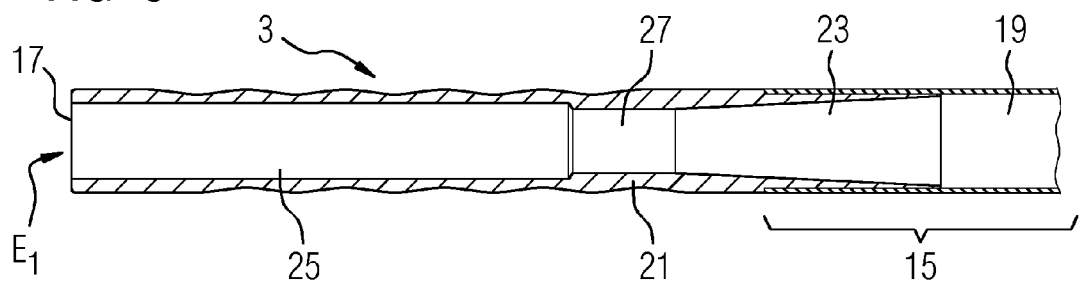
FIG. 5 shows a cross section view of the same root end section as in FIG. 4.

The same can be seen in the section view in FIG. 5. The root end section 3 comprises several inner parts: firstly a distal root end section 25 is prepared for receiving blade bolts which fasten the rotor blade to for example a pitch bearing member of the hub. This distal root end section 25 has a larger diameter than the blade bolts themselves, i.e. no connection can be made between this section and the bolts. Adjacent to the distal root and section 25 there is a threaded intermediate section 27 which is prepared for receiving the blade bolts and, adjacent to that threaded intermediate section 27 there is arranged an inclined section 23 which faces out towards the end of the root end section 3 and which has the function of ensuring that no abrupt transitions are made in this area so that it acts as a kind of stiffness transition or stiffness adaption. On the outside these mentioned elements 23, 25, 27 of the root section 3 are wrapped with fibres 21. These give the root section 3 a curved surface which can easily connect or bond to an injection material of the rotor blade. The curved surface ensures that a secure connection to the cast composite plastic material is obtained an that the root end section 3 and the plastic material cannot slip and slide apart from each other in a longitudinal direction of the supporting rod 1. As can be seen, the transition area 15 partially covers the fibres 21 and projects further from the root end section 3 into a region of a main section 19 of the supporting rod 1 so that there is a smooth non-interrupted interface. The main section 19 of the supporting rod 1 is thus inserted into the transition area 15 which transition area 15 is simply realized as a hollow metal shaft 15 which may be filled, e.g. with PU foam. Whereas the before mentioned inner parts 23, 25, 27, of the root end section 3 are made of steel, which makes them particularly stiff and stable, the main section 19 of the supporting rod 1 is made of aluminum which makes it more lightweight. Other possible materials for the main section 19 of the supporting rods include iron, stainless steel, or PVC.

Figure 6:
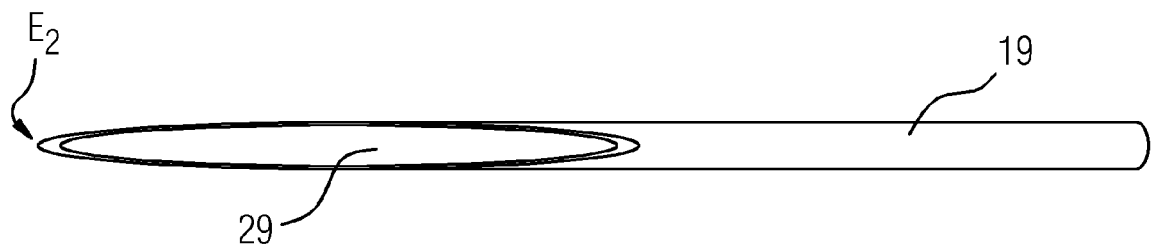
FIG. 6 shows a perspective view of a main section of a supporting rod as can be used in the context of the arrangement of FIG. 1.

FIG. 6 shows in a perspective view a main section 19 of a supporting rod 1 with a second longitudinal end $E_2$, i.e. that longitudinal end which is opposite of the first longitudinal end $E_1$ shown in FIGS. 4 and 5. The main section 19 is made of an aluminum tube which is open towards the second longitudinal end $E_2$ and the shape of which resembles that of a knife blade.

Figure 7:
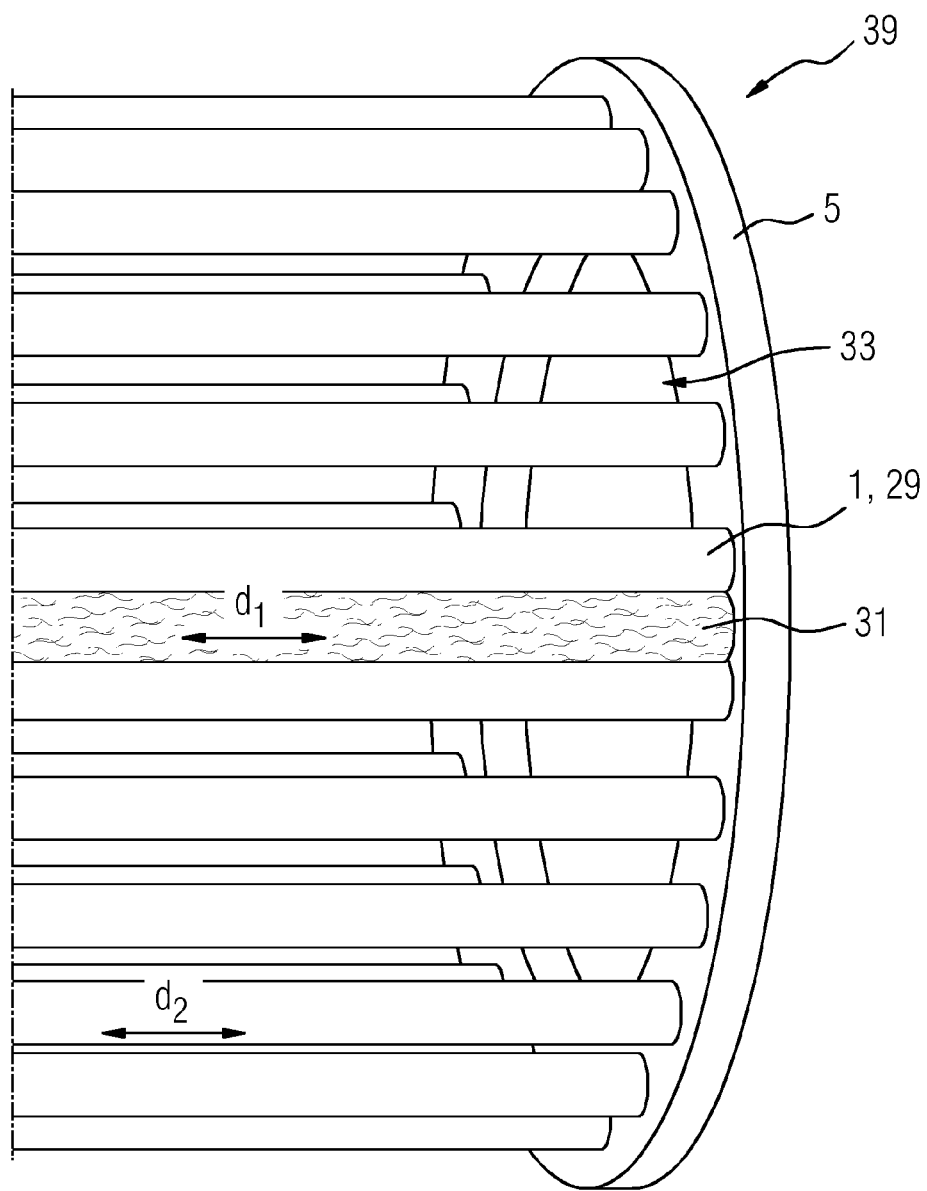
FIG. 7 shows a perspective view of a supporting rods holding arrangement according a first embodiment making use of the arrangement of to FIG. 1.

FIG. 7 shows supporting rods 1 and an arrangement as shown in FIG. 1 with some additional details: firstly, the supporting rods 1 are now wrapped by a plastic tube 29 in order to provide for a better connectability to the injection material which will later be injected around the supporting rods 1, and secondly gaps 33 between the supporting rods 1 can be seen. In one of these gaps fibres 31 have been inserted. These fibres 31 have been supplied in the form of fibre rovings 31 wrapped with a fibre packaging material. The fibre rovings 31 are orientated longitudinally in a first principle main direction $d_1$ which is parallel to a second main direction $d_2$, i.e. a longitudinal axis of a supporting rod 1 (whereby it is noted that also the supporting rods 1 are all aligned in a parallel way). These fibre rovings 31 are later to be connected with an injection material such as a resin and then to form a composite which constitutes the main body of the rotor blade or a root section thereof. The arrangement of FIG. 1 with the fibres 31 inserted now constitute a supporting rod holding arrangement 39 according to a first embodiment.

Figure 8:
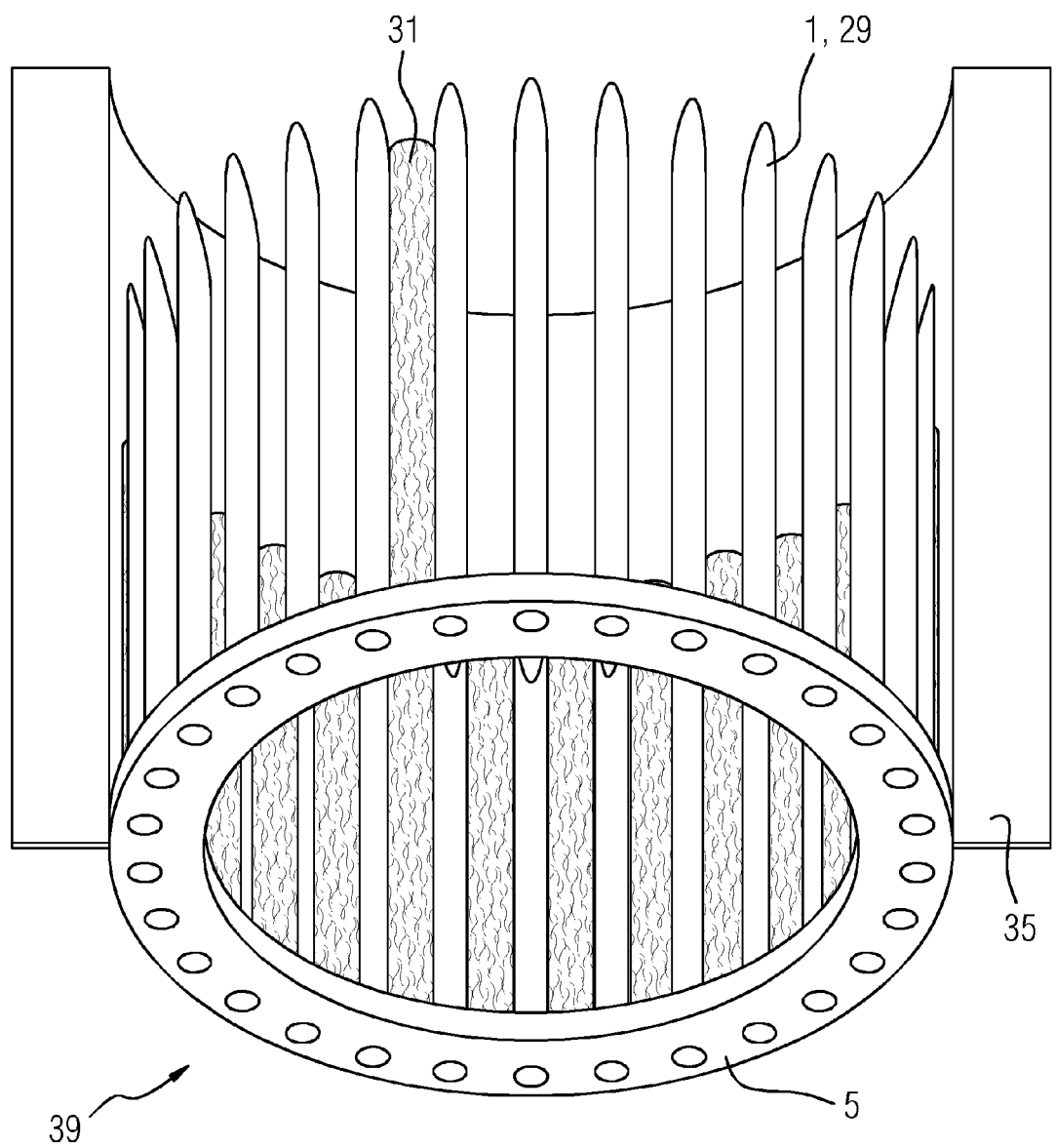
FIG. 8 shows a perspective view of the same supporting rod holding arrangement as in FIG. 7 within a first moulding tool.

In FIG. 8 the supporting rod holding arrangement 39 of FIG. 7 can be seen as it is placed inside the shape of a first moulding tool 35. In most of the gaps 33 there are now inserted the directed fibre rovings 31; before starting the moulding process the rest of the gaps 33 will also be filled with directed fibre rovings 31. If one now places a second moulding tool into the inside of the supporting rod holding arrangement 39, for instance a plastic bag which expands to the inner surface of the circular shape of the supporting rods 1, an injection material can be injected or otherwise be activated in between the two moulding tools. For that purpose, in this case a third moulding tool of the shape of the first moulding tool 35 has to be put above the first moulding tool 35 in the opposite orientation.

Figure 9:
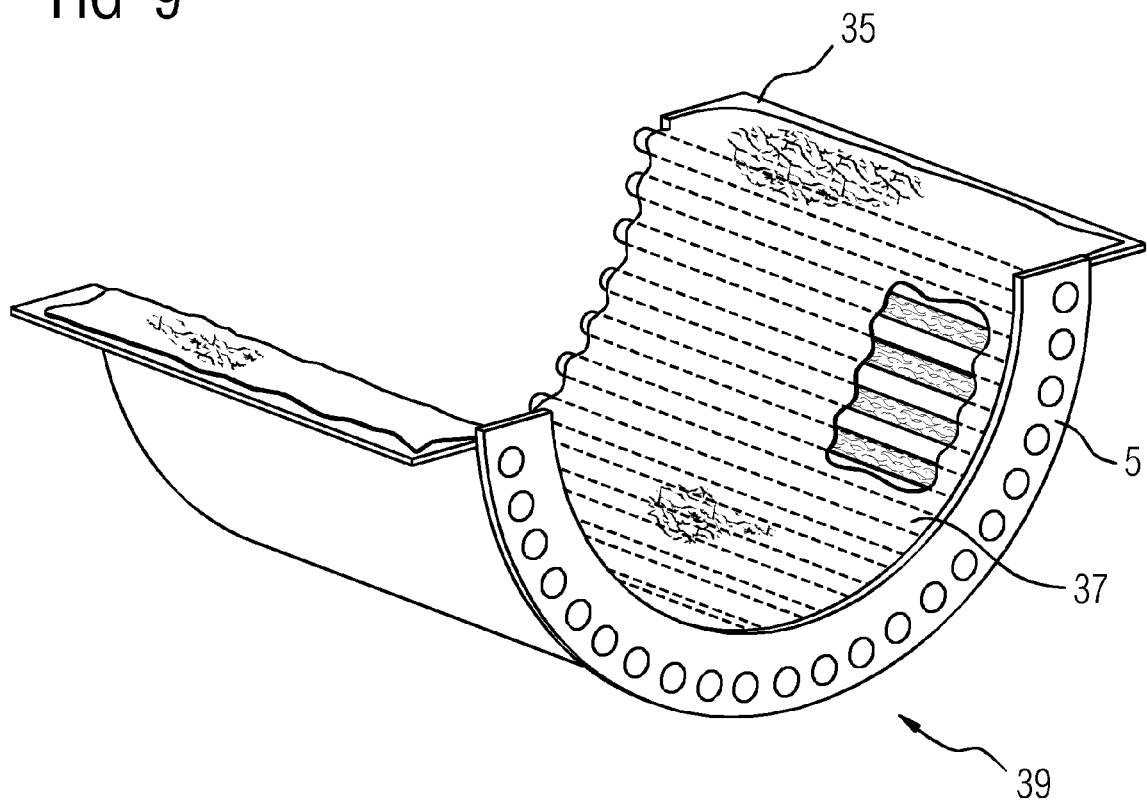
FIG. 9 shows a perspective view of supporting rod holding arrangement according to a second embodiment within a first moulding tool.

FIG. 9 shows a second embodiment of a supporting rod holding arrangement 39 with the difference to the one shown in FIG. 8 that it only has a semicircular shape. In addition, in this figure it can also be seen, that a second fibre 37 has been placed onto the inner surface of the supporting rod holding arrangement 39 in the region of the supporting rods 1 so that fibres cover the supporting rods on the inside which is visible here. This provides for an increased strength of the root end to be produced. The same can be done on the other side, i.e. the side of the supporting rods 1 facing towards the first moulding tool 35.

Figure 10:
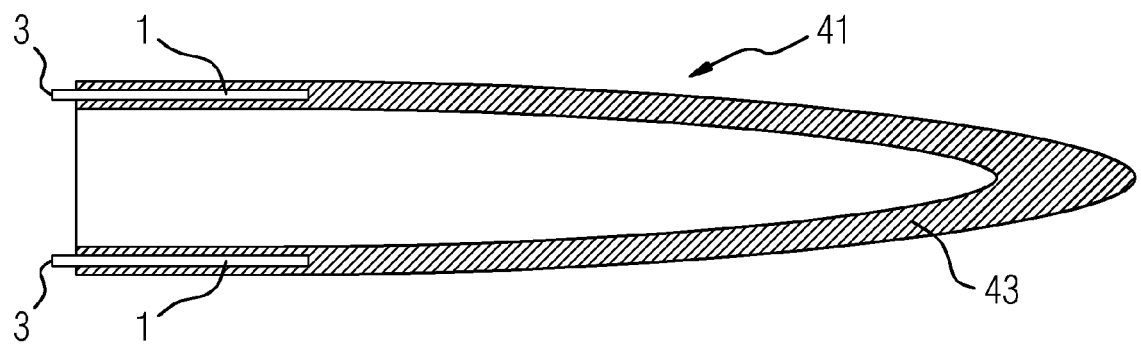
FIG. 10 shows a rotor blade according to an embodiment in a section view.

FIG. 10 depicts a rotor blade 41 of a wind turbine according to an embodiment. For the sake of clarity, the expression "root end" of the rotor blade 41 is applied here for the complete rotor blade 41, as the rotor blade 41 is produced in one piece here. The rotor blade 41 comprises a main body 43 made of composite material comprising fibres as well as an injection material which is firmly connected, i.e. bonded, to the fibres. On the left-hand side end of the rotor blade 41 there can be seen two supporting rods 1 which have been moulded into the main body 43 and which are firmly bonded to the main body 43. Only the root end sections 3 project out from the main body 43 so that they can be connected to a wind turbine hub.

Figure 11:
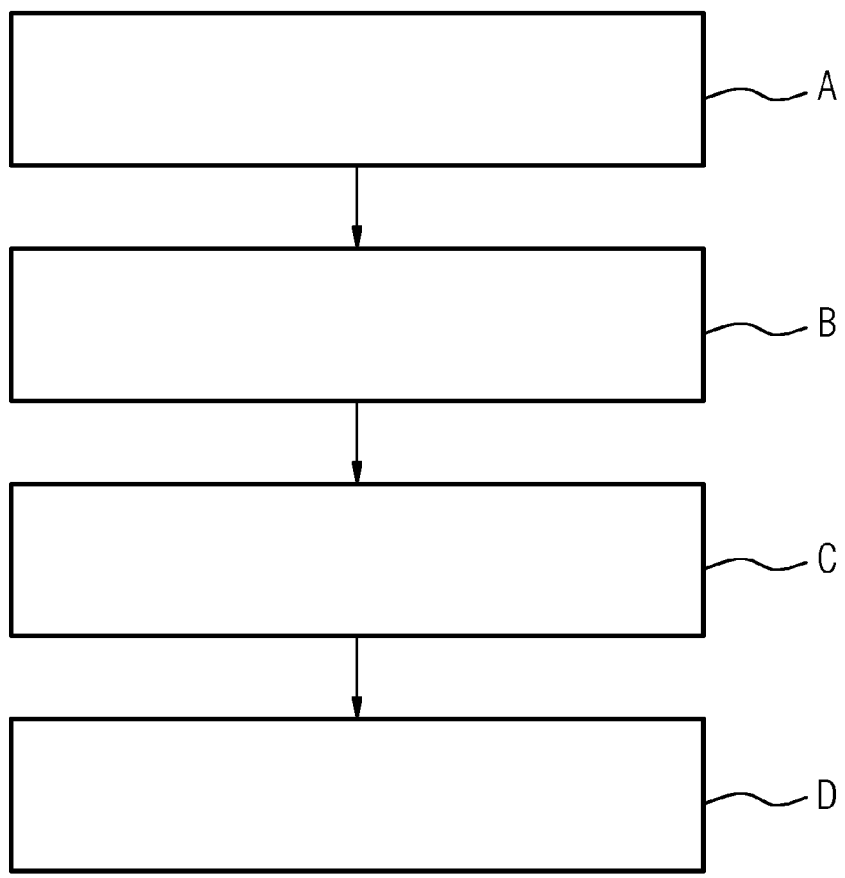
FIG. 11 shows a block diagram of a succession of steps during an embodiment of a method.

FIG. 11 shows in a block diagram the principal steps of an embodiment of the method: in a first step A several supporting rods 1 of the kind as shown in FIGS. 4 to 6 are assembled along an essentially circular shape such that there are gaps 33 between the supporting rods 1. Then, in a second step B, fibres 31 are introduced into the gaps. These fibres 31 are compatible physically and/or chemically with an injection material, for instance a resin, so that they bond together firmly. In a third step C a first moulding tool 35 is placed along an outer surface of the circular shape and a second moulding tool along an inner surface of the circular shape. In a fourth step D such injection material is treated so that it bonds firmly with the fibres 31. Such treatment can comprise heating, in particular melting and/or injecting the injection material and/or sucking the injection material into the gap between the two moulding tools.

Although the present invention has been disclosed in the form of preferred embodiments and variations thereon, it will be understood that numerous additional modifications and variations could be made thereto without departing from the scope of the invention. As mentioned above, the root end can be produced in one part or in several parts, and the embodiment of the supporting rod is one advantageous example which can however be altered in many ways.

For the sake of clarity, it is to be understood that the use of "a" or "an" throughout this application does not exclude a plurality, and "comprising" does not exclude other steps or elements.

The invention claimed is:

1. A method of manufacturing a root section of a rotor blade of a wind turbine, comprising:
   assembling a plurality of supporting rods, each having an interface section for connecting to a hub interface of the wind turbine in an essentially circular shape such that there are gaps between the supporting rods;
   arranging a plurality of first fibers in the gaps which the plurality of first fibers are physically and/or chemically compatible with an injection material;
   placing a first molding tool along an outer surface of the circular shape and a second molding tool along an inner surface of the circular shape; and
   treating the injection material so that it bonds with the plurality of first fibers such that the injection material is made sufficiently liquid to migrate between the fibers and then be cured in order to firmly bond with them,
   wherein space between the outer surface of the circular shape and the first molding tool and/or between the inner surface of the circular shape and the second molding tool is filled with a plurality of second fibers which are physically and/or chemically compatible with the injection material.

2. The method according to claim 1,
   wherein the plurality of first fibers and the plurality of second fibers comprise the same material.

3. The method according to claim 1,
   wherein the plurality of first fibers comprise a glass fiber material.

4. The method according to claim 3,
   wherein the plurality of first fibers are orientated essentially in one main direction essentially parallel to longitudinal axes of the supporting rods.

5. The method according to claim 1,
   wherein the plurality of first fibers comprise a fiber roving with the plurality of first fibers orientated essentially in one main direction.

6. The method according to claim 1,
wherein the supporting rods are wrapped with a filling element.

7. The method according to claim 6,
wherein the filling element comprising first fibers and/or a plastic tube.

8. The method according to claim 1, comprising:
temporarily securing the interface section of a supporting rod to a supporting tool, the supporting tool comprises a root flange,
wherein the supporting rod is fixed to the root flange.

* * * * *